Dec. 14, 1965  G. E. LINEBURG  3,223,578
METHOD OF OVERCOATING POLYOLEFIN SURFACES TO
BE BONDED TO POROUS SUBSTRATES
Filed July 7, 1961
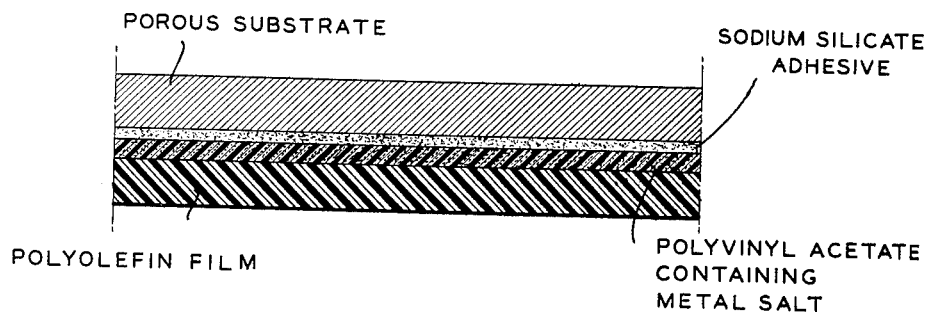
INVENTOR
GLENN E. LINEBURG
BY *Allen A. Meyer, Jr.*
ATTORNEY

United States Patent Office 3,223,578
Patented Dec. 14, 1965

3,223,578
METHOD OF OVERCOATING POLYOLEFIN SURFACES TO BE BONDED TO POROUS SUBSTRATES
Glenn E. Lineburg, Tuscola, Ill., assignor to National Distillers and Chemical Corporation, New York, N.Y., a corporation of Virginia
Filed July 7, 1961, Ser. No. 122,414
13 Claims. (Cl. 161—254)

This invention relates to a method for bonding polyolefins to porous materials. More particularly, this invention relates to a bonding method and also to the laminated products formed thereby, wherein a treated polyolefin surface is overcoated with polyvinyl acetate in which is incorporated a small quantity of certain metal salts in order to make the surface permanently receptive to gluing with sodium silicate adhesives.

As used herein, the term "polyolefin" refers to the polymeric resins formed through the polymerization of an aliphatic unsaturated hydrocarbon. The monomers from which the polyolefin is prepared are preferably the lower 1-olefins. Typical examples are polyethylene and polypropylene.

For purposes of illustration, the invention will be described primarily with respect to the use of polyethylene, although it is to be understood that other polyolefins may be used. Polyethylene polymers having a molecular weight from about 20,000 to 50,000 $\overline{M}_N$ and densities within the range of about 0.92 to 0.94 are especially suitable for the purposes of this invention, although polymers having molecular weights and densities outside these ranges can be employed.

Polyethylene plastic material possesses many desirable characteristics including inertness to most chemicals and solvents at ordinary temperatures, toughness, and flexibility. Relatively thin sheets polyethylene have found extensive use as containers, as liners of containers, in coverings, and in other allied uses.

One of the major problems is using polyethylene films and coatings is their lack of adhesion to other materials. Untreated polyethylene film is almost completely inert chemically. Thus, one of its surfaces must be altered in order to achieve good adhesiveness for coatings, inks, etc. The film surfaces have been treated successively for easy adhesion by chemical as well as physical means. Both classes of treatment have the effect of producing a clean, polar surface on the film. This makes the surface receptive to the adhesive which then becomes bonded to form a laminate. Chemical treatments are usually more costly and difficult to apply than physical treatments and hence are less frequently used.

The two physical methods of treatment commonly used in the art for preparing a polyethylene surface to improve its adhesive properties are the flame method and electronic treatment. Both treatments make the surface receptive to bonding by oxidizing it slightly. In the flame, or heat treating method, the flame strikes the film as it passes over a water-cooled, chrome-plated drum. Thus, one film surface is subjected to a high temperature while the other surface and the bulk of the film are being chilled. In the electronic treatment the polyethylene film passes under a series of electric conductors carrying a high voltage. The voltage jumps the air gap, usually resulting in a corona discharge. This results in surface treatment, by means of ionization of air in the gap between the electrode and the film surface. It is believed that the ozone generally causes oxidation of the film surface. Spreading of the adhesive is enhanced by the treatment so that the film is completely wetted, and the adhesive permeates the roughness of the thin, oxidized surface layer. When the solvent present in the adhesive has evaporated, the polyethylene surface is bonded to the new surface chemically or physicaly or both.

Numerous coatings, including polyvinyl acetate, have also been applied to the polyethylene surface to improve the adhesion thereto of porous substrates. Such a coating is not an adhesive itself, but acts as a sandwich coat which permits the two normally non-adherent surfaces to adhere in the presence of an adhesive substance. Any coating used for this purpose must be of such character that it will not stick to adjacent layers in the roll or stack under the pressure to which the layers are subjected. Otherwise, as the coated material is unrolled or removed from the stack, portions of the coating may be torn loose or become marred, rendering such portions of the coated material unsatisfactory for use.

Polyethylene films treated by the above methods, however, cannot be bonded to porous substrates using the inexpensive sodium silicate adhesives. In fact, the use of sodium silicate as an adhesive for bonding polyethylene to paper by any method has not heretofore been possible. A need existed for a simple and inexpensive method of imparting to polyethylene the properties of adhering to porous materials, and especially to paper.

One object of this invention is to provide a method for bonding polyethylene to porous materials which overcomes the difficulties encountered in the prior art procedures. Another object of the present invention is to provide a method for utilization of inexpensive sodium silicate adhesives for bonding polyethylene films to porous substrates. A further object of this invention is to provide a method for bonding polyethylene to paper, utilizing a sodium silicate adhesive. A still further object of the invention is to provide novel laminated materials comprising a polyolefin film extruded on a porous material, overcoated with polyvinyl acetate and bonded to a porous material.

In accordance with the present invention, these and other objects are accomplished by incorporating a metal salt such as aluminum chloride, zinc chloride, or the bromides of metals in the polyvinyl acetate, thereby permitting the coated polyolefin film to be affixed to porous materials with sodium silicate adhesives such as those sold under the trademark PQ as described in the bulletin entitled "PQ Soluble Silicates" published by the Philadelphia Quartz Company. These adhesives are also described in an article by Robert R. Kreyling entitled "Sodium Silicates: Versatile Inorganic Adhesives" published in Adhesives Age, July 1959. The metal salt is preferably added to an aqueous solution of the polyvinyl aceate which is then applied to the polyethylene surface by any conventional method, for example, by brush, spray, dip, or knife methods. The filmed solution is then allowed to dry, for example, by passing through an oven. The coated polyethylene sheet can be used immediately or wound up and put aside for another coating operation.

In the accompanying drawing there is shown an enlarged cross-sectional view of a laminated product prepared in accordance with the present invention.

In a preferred embodiment of this invention, the aluminum or zinc chloride or bromide is added in an amount equal to about 0.1 to 3.0% by weight, and preferably about 0.25 to 1.0% by weight, to a freshly prepared aqueous polyvinyl acetate solution of about 25% concentration. Generally a polymer content of about 10–50%, preferably about 25%, is used since less water has to be driven off. Higher concentrations tend to be too viscous, and lower concentrations contain too much water. The solution is used immediately so as to avoid possible hydrolysis of the polyvinyl acetate to polyvinyl alcohol. The resulting polyvinyl acetate dispersion yields a clear, transparent film of polyvinyl acetate when spread on a treated polyethylene surface and dried at about 200° to 300° F.

The treated polyethylene surface which has been overcoated with a polyvinyl acetate film in which is incorporated a small quantity of aluminum or zinc chloride or bromide can be advantageouly attached to a porous material by merely contacting the two materials using a sodium silicate adhesive and allowing time for the water in the sodium silicate adhesive to be absormbed in the cellulose material. Whatever the explanation, the modified polyethylene surface behaves as if the metal salt present in the overcoat becomes incorporated in the adhesive, with the resultant improvement in the bond.

The adhesive may be applied to the surface in many different ways, such as spraying, dipping, brushing on, etc. Conventional apparatus such as that normally found in use by paper manufacturers may be used. For example, the adhesive may be fed to a direct through-feed adhesive dispensing and applying apparatus and applied as a layer; the paper sheeting being at once deposited on the adhesive layer and lightly rolled into engagement. The polyethylene and substrate are joined together by this procedure at a rate which can be as high as about 80 to 300 feet per minute. A strong bond is obtained with no distortion of the polyethylene sheets joined. The bond between the adjacent surface portions of the sheets joined are integrated with the cement so that the joined surfaces cannot be separated without destruction of the sheeting.

In general, it is necessary only to use a sufficient amount of sodium silicate adhesive to effect the necessary bond. Normally from about 2 to 10 lbs. of adhesive per 3000 sq. ft. are sufficient to make a firm bond.

This method of incorporating a metal salt into a polyvinyl acetate coating on the treated polyethylene film, and then attaching thereto a porous material by means of a sodium silicate adhesive is not limited to a two-layer construction, but may be used for succesive laminations of polyolefin and porous materials. Where it is desired to form several laminations, it is only necessary to increase the number of sheets of the polyolefin or the porous material. The use of combinations of laminae which provide barriers to various materials such as water, oils, acetic acid, etc., permits control over product permeability.

In multi-layer constructions it is usually preferable to first extrude the polyethylene film onto a porous substrate such as paper, using any suitable conventional method. Depending upon the particular use to which the final composition is to be put, one or both sides of the paper may be coated. In this process a polyethylene film is applied to the paper web directly after the extrusion of the film while the later has a temperature ensuring an adequate adhesion between the plastic material and the paper, the coating being completed by passing the film and the web together under pressure through the nip of two pressure rolls.

The polyethylene surface is preferably electronically treated in line directly after the coating. The overcoating with polyvinyl acetate from the polyvinyl acetate solution, to which aluminum or zinc chloride or bromide has been added, is applied in any suitable manner, for example, using flexographic or gravure equipment.

The material is then run through an oven at 200°–300° F. to dry, after which the coated substrate may be used immediately or wound up and used later.

A three-layer construction of polyethylene/paper/polyethylene would ordinarily be prepared by extrusion coating the polyethylene on both sides of the paper. However, a three-layer construction can also be formed by extruding polyethylene on one side of the paper and then bonding another polyethylene surface to the other side of the paper, using the sodium silicate adhesive.

Any backing or porous material capable of being extrusion-coated with a polyolefin, and particularly polyethylene, is useful in the present invention. Among suitable backing sheets and films may be mentioned kraft paper, boxboard, cloth, felt, foil, cellophane, etc. Of particular utility are the porous or absorbent cellulose backings, such as kraft paper and boxboard substrates.

Food containers manufactured entirely from polyethylene film have a pronounced tendency to stretch, making the use of polyethylene film alone less desirable for some purposes. When the film is laminated to paper, however, the stretching property normally inherent in the plastic film is not present. The laminated materials prepared by the process of this invention exhibit toughness sufficient to withstand scoring without cracking. It has been found that the compositions may be subjected to severe folding operations without exhibiting a resultant separation in the continuous polyolefin film or acetate overcoating by way of cracking or chipping. Moreover, the scoring that is necessary to form a carton into its desired shape will not be accompanied by a cracking or peeling of the plastic coating.

The process of this invention is applicable to making face-to-back seals. This is especially important in the manufacture of food containers and liners. Many of such uses require that a seam or joint be formed between a polyethylene surface and a cellulose surface. The inertness of the usual polyethylene surface interferes with adhesion by most of the commonly employed adhesives or coating agents. Moreover, it often happens that, although the bond formed is of acceptable strength for a short period after completion, within a short time of at most a few days the bond weakens to such an extent that the bonded surfaces may fall apart. The process of this invention provides a means whereby edge portions of the polyethylene-to-substrate material may be sealed together using sodium silicate.

The data given in the following table show that when an electronically treated polyolefin surface is glued to paper with sodium silicate the bond has no resistance to peel, as measured by the Peel Resistance test method. Moreover, when an electronically treated polyethylene surface is overcoated with a polyvinyl acetate film the peel resistance is only 40 grams/inch, an amount insufficient to provide adequate bonding. However, when aluminum chloride in an amount up to 0.5% is incorporated in the polyvinyl acetate film, the peel resistance is increased to 580 grams/inch, which is more than ten times the value without the aluminum chloride additive and which indicates a strong bond. The shear resistance increases from 227 grams/inch for the electronically treated polyethylene and from 590 grams/inch for the electronically treated polyethylene with a polyvinyl acetate overcoating to a value of 817 grams/inch which is the highest measurement before the paper ruptures. That is to say, in the shear resistance test the paper ruptures before the bond breaks.

*Effect of aluminum chloride and zinc chloride in a polyvinyl acetate overcoating on the bond between polyethylene and paper substrates*

| Sample | Peel resistance, grams/inch | Shear resistance, grams/inch |
|---|---|---|
| 1. Electronically treated polyethylene | None | ᵃ 227 |
| 2. Electronically treated polyethylene with polyvinyl acetate overcoating | 40 | 590 |
| 3. Electronically treated polyethylene with polyvinyl acetate overcoating containing 0.25% aluminum chloride | 68 | ᵃ 817 |
| 4. Electronically treated polyethylene with polyvinyl acetate overcoating containing 0.5% aluminum chloride | 580 | ᵃ 817 |
| 5. Electronically treated polyethylene with polyvinyl acetate overcoating containing 1.0% aluminum chloride | 432 |  |
| 6. Electronically treated polyethylene with polyvinyl acetate overcoating containing 3.0% aluminum chloride | 295 | ᵃ 681 |
| 7. Electronically treated polyethylene with polyvinyl acetate overcoating containing 1.0% zinc chloride | 388 |  |

ᵃ The paper broke before the bond ruptured.

The polyvinyl acetate solutions used for overcoating the polyethylene in the above samples were prepared by adding the designated parts by weight of commercial grade crystalline $AlCl_3 \cdot 6H_2O$ (calculated as $AlCl_3$) or $ZnCl_2$ (dry, granular, technical) to a solution prepared by diluting one part by weight of commercial polyvinyl acetate, National Starch Resyn 33–1171, with three parts of water.

The Peel Resistance test is a modification of ASTM–D–903–49 in which the two ends of the film are placed so that one must bend 180° during peeling, and the force required to break the bond is recorded. The Shear Resistance test is a modification of ASTM–D–1002–53T in which the opposite ends of the same sample are pulled in opposing directions. The premanency of the bonds formed above when aluminum and zinc chlorides were employed still existed after the laminated film has been aged for two months at 160° F.

While particular embodiments of this invention are shown above, it will be understood that the invention is obviously subject to variations and modifications without departing from its broader aspects. For example, metal salts such as magnesium chloride or bromide may be utilized effectively to enhance the applicability of the sodium silicate adhesive.

What is claimed is:

1. A laminate comprising a film of a homopolymer of lower 1-olefins bonded to a porous substarate with sodium silicate adhesive, said film having been previously treated to make it more adherent and then overcoated with polyvinyl acetate in which is incorporated about 0.1 to 3% by weight of a metal salt selected from the group consisting of aluminum chloride, zinc chloride, aluminum bromide and zinc bromide.

2. A laminate comprising polyethylene film bonded to paper with sodium silicate adhesive, said polyethylene film having been previously treated to make it more adherent and then overcoated with polyvinyl acetate in which is incorporated about 0.1 to 3% by weight of a metal salt selected from the group consisting of aluminum chloride, zinc chloride, aluminum bromide and zinc bromide.

3. The laminate of claim 2 wherein said metal salt is aluminum chloride.

4. The laminate of claim 2 wherein said metal salt is zinc chloride.

5. A laminate comprising a substrate web, a film of a homopolymer of lower −1 olefins extrusion coated on at least one surface of said substrate, the exposed surface of the homopolymer film bonded to a separate porous substrate with sodium silicate adhesive, said exposed homopolymer film surface having been previously treated to make it more adherent and coated with polyvinyl acetate in which is incorporated about 0.1 to 3% by weight of a metal salt selected from the group consisting of aluminum chloride, zinc chloride, aluminum bromide and zinc bromide.

6. The laminate of claim 5 wherein said homopolymer film is polyethylene and said substrate is paper.

7. A method for affixing a surface of a homopolymer of lower 1-olefins to a porous substrate which comprises overcoating said surface, which has been treated to make it more adherent, with polyvinyl acetate in which is incorporated from about 0.1 to 3% by weight of a metal salt selected from the group consisting of aluminum chloride, zinc chloride, aluminum bromide, and zinc bromide, and bonding said polyvinyl acetate overcoated surface to a porous substrate with sodium silicate adhesive.

8. The method of claim 7 in which said homopolymer surface is polyethylene.

9. The method of claim 7 wherein said homopolymer surface is corona discharge treated.

10. The method of claim 7 wherein said homopolymer surface is flame treated.

11. The method of claim 7 wherein the homopolymer surface is overcoated with polyvinyl acetate in which is incorporated aluminum chloride.

12. The method of claim 7 wherein the homopolymer surface is overcoated with polyvinyl acetate in which is incorporated zinc chloride.

13. The method of claim 7 wherein said porous substrate is a cellulose material.

References Cited by the Examiner

UNITED STATES PATENTS

| 2,414,360 | 1/1949 | Carter | 154—46 |
| 2,549,516 | 4/1951 | Parry | 117—76 |
| 2,575,727 | 11/1951 | Peters | 117—76 |
| 2,806,256 | 9/1957 | Smith Johansen | 156—77 |
| 2,991,217 | 7/1961 | Schmidt et al. | 154—46 |
| 3,036,930 | 5/1962 | Grimminger et al. | 117—138.8 |

FOREIGN PATENTS

| 10,082 | 8/1885 | Great Britain. |

OTHER REFERENCES

Sodium Silicates, by Robert L. Kreyling, published in "Adhesives Age," July 1959, 3 pp.

ALEXANDER WYMAN, *Primary Examiner.*